United States Patent Office 2,986,645
Patented May 30, 1961

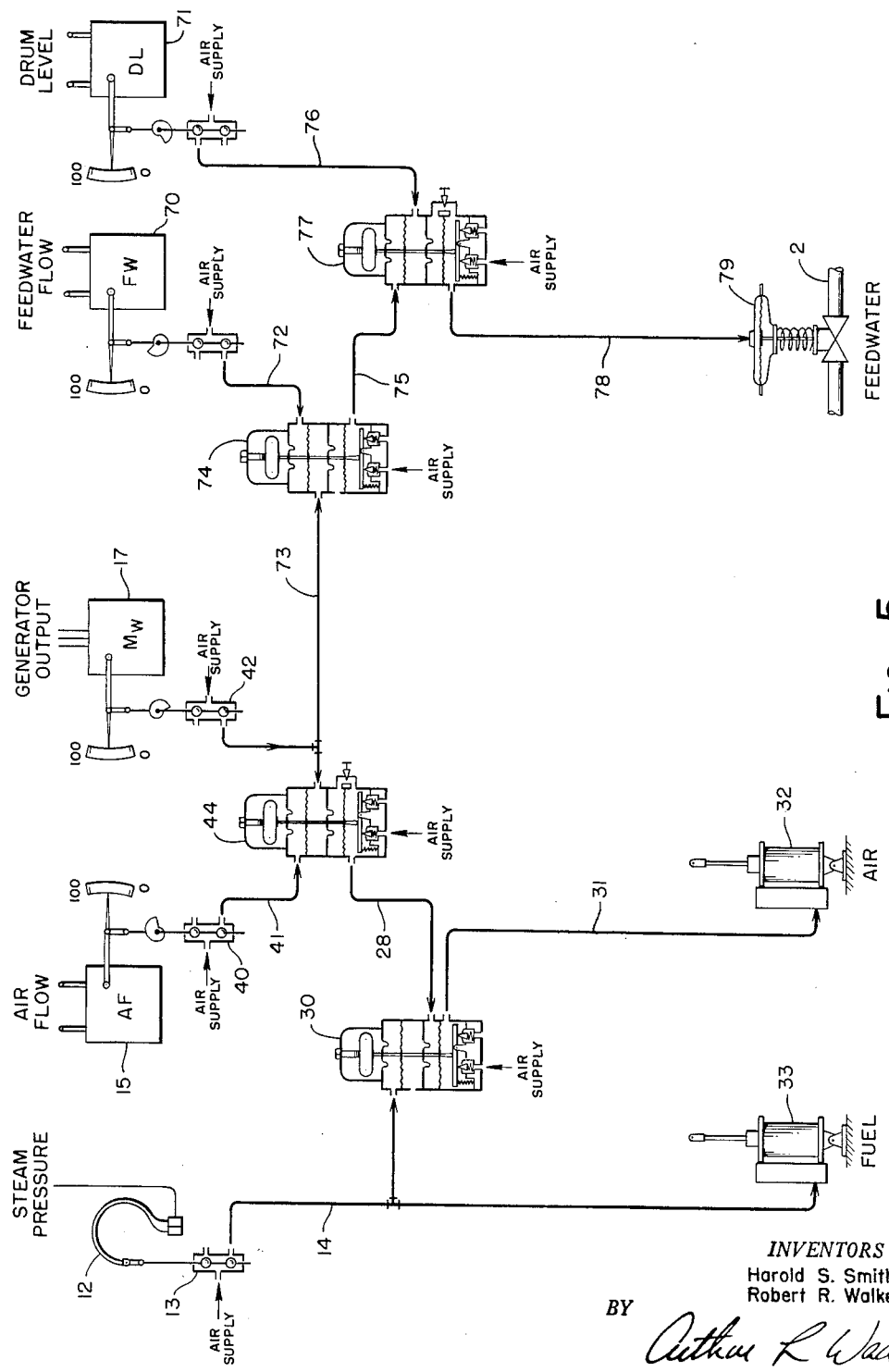

2,986,645

COMBUSTION CONTROL

Harold S. Smith, Richmond, Ind., and Robert R. Walker, Willoughby, Ohio; said Smith assignor to Combustion Engineering Inc., a corporation of Delaware, and said Walker assignor to Bailey Meter Company, a corporation of Delaware Filed Dec. 6, 1956, Ser. No. 626,683

15 Claims. (Cl. 290—2)

The present invention relates to the control of a combustion process utilized to generate steam in the production of electrical power. It is an object of the present invention to utilize the variations of factors of the overall process to control the elements related to the combustion process to maintain their most efficient relation to each other as empirically determined.

There are many factors essential to the operation of power producing, or using, apparatus. It is customary for meters to respond to these factors of pressure, flow, level, gas analysis, electrical power produced, etc. As a part of the control system for these factors, it is an object of the invention to provide a device which responds to two of the factors to produce an output representative of the relation, or departure from the relation, between the two factors, which relation is most efficient for the process operation.

More specific examples of the factors of a power producing, or using, process are the flow of air to support combustion, the flow of steam and the flow of the products of combustion, the level of water stored in the apparatus of the process, the flow of fuel, the pressure of the fluids, and the flow of electrical power produced. In referring to the "relation" that does, or should, exist between two of these factors, we do not mean merely the simple ratio that exists at any one particular rate of output or under one set of conditions, but we use the word in its broad sense as applied to a physical law which exists between two factors whatever the intensity or value of one may be. All physical laws may be expressed by means of mathematical equations or formulas, although many of them are so complicated that in practical engineering application the relation is shown by plotting the factors as a graphic curve.

In example, assume it desirable to indicate the condition of desired efficiency of a steam turbine and electric generator set. The input is the steam consumed and the output is the megawatts of electrical power developed. It is known that throughout the range of output the relation of these two factors is such as to be capable of expression by mathematical equation in which the steam input may be assigned the value X and the megawatt output assigned the value Y. The difficulty of indicating the relation between these two factors X and Y in the apparatus is that they do not bear to one another any simple relation nor even a constant ratio. X is not to Y as 1 is to 2, or as 2 is to 3, but the relation is much more complicated. In general we may express the equation of the relation as $X=f(Y)+A$ where $f$ is some function of Y and A is a constant.

The function may be a multiplier or a divisor or a power or a root, etc. The steam input X may have a range from 10% to 100% of the capacity of the apparatus. At any given value of the steam input X the value of Y is determined by the equation. In other words, a perfectly definite rate of steam input X is required to produce a given rate of electrical output Y. For each different value of Y, X will have a corresponding and definite relation in accordance with the equation so long as the desired operating efficiency exists. Should some change take place in the mechanical adjustment for the operating conditions of the turbine, that would affect its efficiency, then a different relation or equation would exist between X and Y.

The purpose of the present invention is to show whether or not the desired relation exists between two factors corresponding to X and Y, whatever their actual values or rate of output of the apparatus may be. We accomplish this by providing separate meters which will respond to each of two factors of a power producing process and actuate a means to correlate the meter indications so that the two meter indications will cause the correlating means to have a specified output at the optimum efficiency of the apparatus indicated by the meters, or the directional departure from the specified value.

The object of this invention then becomes to provide an apparatus which will instantly show in itself alone, without the necessity of any calculation or reference to tables or curves, whether or not a desired efficiency of a process is being maintained, and if not, to produce a control effect in the proper direction to return the operation of the process to the desired efficiency by the manipulation of a selected one of the factors.

Our invention is specifically embodied in the plurality of meters continuously responsive to individual factors of the power producing process. These meters produce forces which are applied to suitable means to correlate them so that any departure from the desired relation between the factors to which the meters are responsive produces a single indication and impulse for control of a selected factor.

In general, the correlation is accomplished by suitably arranging the meters so that the manifestation of one of them will always produce the same reading as the manifestation of the other when the factors to which each meter is responsive have values which ought to exist at the rate of output which is being maintained. More specifically, the correlating means is responsive to a factor of the combustion process which is indicative of the heat released in the process and a factor which is indicative of the heat absorbed from the process. The correlating means produces a control impulse which is applied to the control of either fuel or air, the factors supplied the combustion portion of the process. More specifically, there is disclosed a meter responsive to the air flow to the combustion and a meter responsive to the amount of electrical power generated by the steam produced which act on linkage and relays to produce a pneumatic control pressure.

The pneumatic control pressure is applied to the readjustment of the basic control of air flow which has been applied from steam pressure as a demand index. Additionally, the meter responsive to electrical power is applied to the regulation of feedwater to the steam generator. More specifically, with respect to this control of feedwater, a meter is disclosed as responsive to the flow of feedwater to the steam generator, a meter is disclosed as responsive to the quantity of water in the steam generator, and, these meters, together with the electrical power output meter, establish a pneumatic control pressure applied to the regulation of feedwater.

Figure 4:
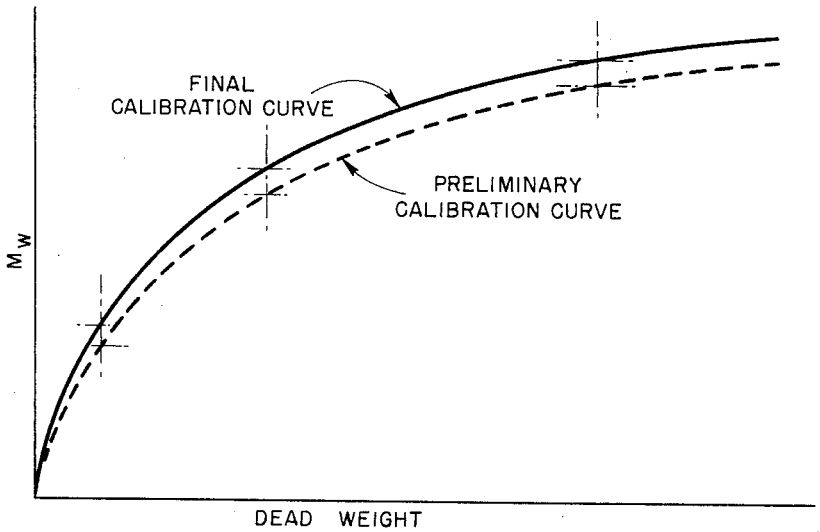

Fig. 4 is a graph illustrating the practical problem of calibrating the correlating means responsive to the individual meters.

Figure 2:
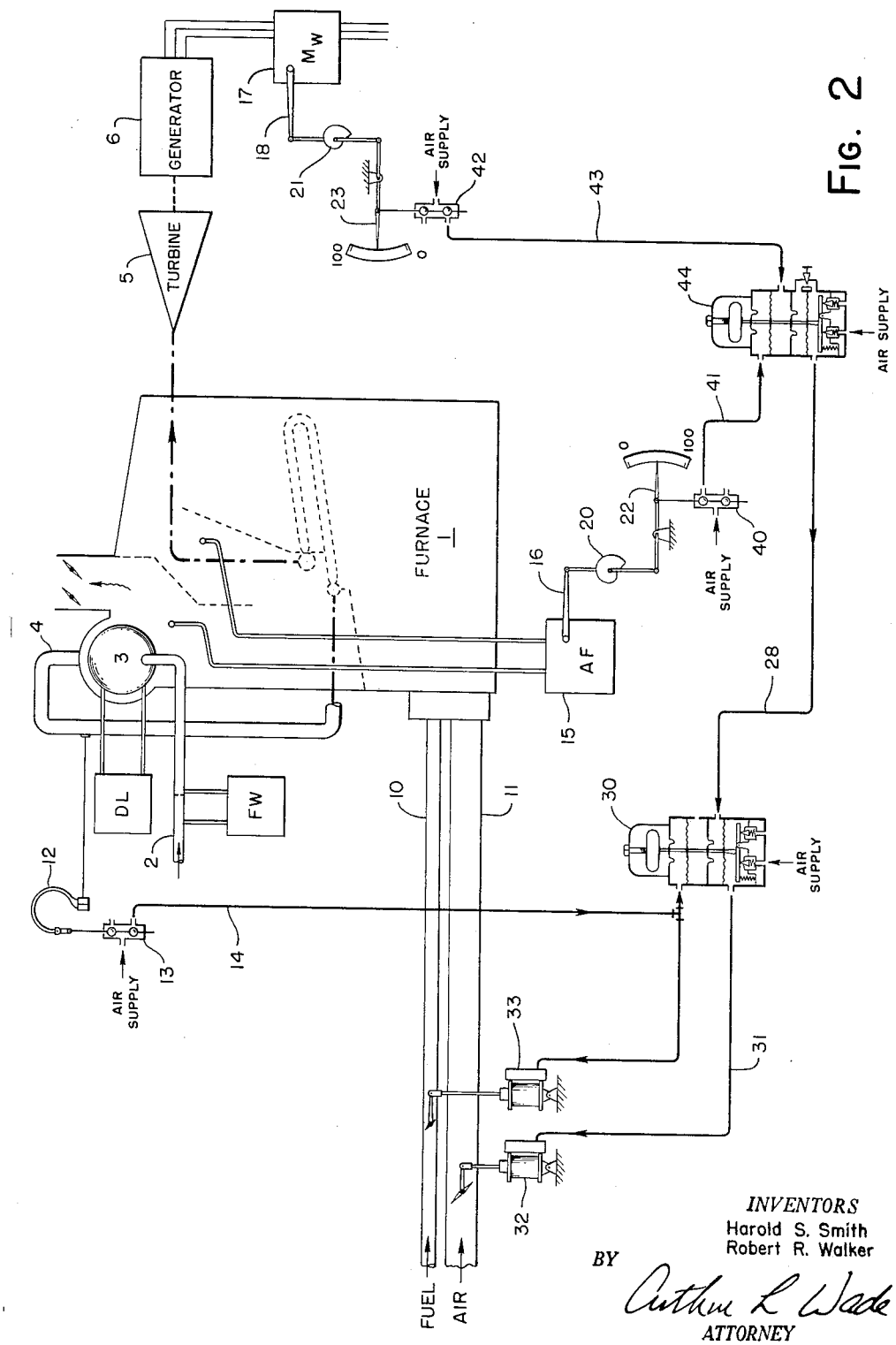
Fig. 2 is a diagrammatic illustration of the electrical power producing apparatus controlled by a variation of the system of Fig. 1.

Fig. 5 is a diagrammatic illustration of a control system similar to that disclosed in Fig. 2, with the addition of a segment for control of feedwater.

Figure 1:
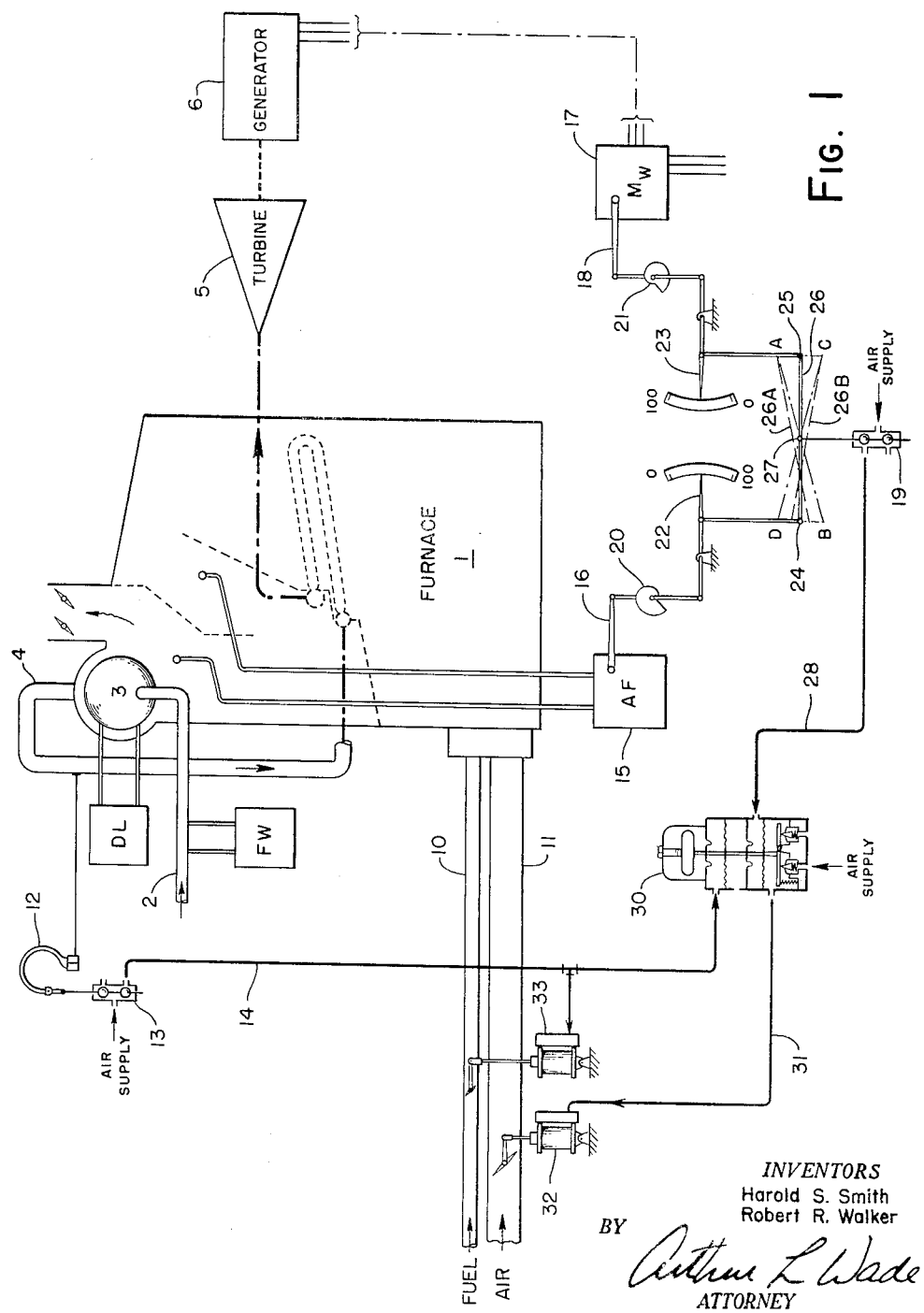
Fig. 1 is a diagrammatic illustration of an electrical power producing apparatus with combustion controlled by a system embodying the present invention.

Referring to Fig. 1, there is shown a furnace 1 in which combustion is made to take place. The heat of this combustion is transmitted to water to produce steam. The feedwater is brought, with pipe 2, into drum 3. The heat of the furnace is transmitted to the water in the drum to produce steam which is removed with pipe 4. An extension of pipe 4 forms a so-called superheater in the furnace for further raising the steam temperature before applying it to turbine 5. With turbine 5 rotated by the steam, a source of motive power is provided for generator 6 in producing electrical power.

Obviously this showing is quite diagrammatic and there are a myriad of details not shown. Essentially, however, the generation of steam to produce electrical power can be traced. The cycle of this process is considered from the view of the variables associated with it. Obviously the support of combustion in furnace 1 is of prime importance. Fuel is brought to the furnace 1 by pipe 10 and air is brought by pipe 11. The control of these variables is basic to the propagation of combustion for ultimately producing electrical power by generator 6.

As the demand for electrical power fluctuates, the amount of steam flowing to the turbine is varied. A primary factor reflecting this changing demand is the pressure of the steam carried by pipe 4. A meter, characterized by the Bourdon tube 12, responds to the steam pressure in pipe 4 and actuates a pilot valve 13 to establish a telemeter fluid pressure in pipe 14 representative of the steam pressure. The pneumatic fluid pressure control impulse in pipe 14 is applied simultaneously to the control of the fuel and air which support the combustion.

The quantity of both fuel and air supplied a combustion process represents the amount of heat released by the combustion. It is desirable to maintain these variables in a proportion which will carry the combustion process out at optimum efficiency. Obviously, it is necessary to utilize control variables which are representative of fuel and air.

Air can always be measured directly, and under optimum conditions the heat released is proportional to the fuel supplied. The steam produced is proportional to the heat released and therefore to the fuel supplied. It is a well known convention to ascertain the relation between air flow and steam flow for optimum conditions and to readjust either the fuel or air regulation with this index. We have determined that, where steam flow can not be measured, the electrical output of the generator is an adequate index of heat released in readjusting control of one of the elements of combustion.

In the disclosure, the electrical power generated by generator 6 is selected as the heat-absorbed control index. Air flow through the furnace and the quantity of electrical power generated then become important control variables in the regulation of combustion in furnace 1. As indicated supra, within their respective ranges, these two variables bear a determinable relation to each other when furnace 1 is operated at optimum efficiency. It is this relation which is utilized in control of combustion to maintain it at its peak of efficiency over a range in demand.

With it now clearly before us that the heat absorbed in furnace 1 is represented by the output of generator 6 in terms of megawatts, we see this variable as essentially a substitution for the more conventional steam flow index. Further, not only can megawatts be utilized in control of the combustion phase of the process, but it can be utilized in a multi-element system of control for feedwater supplied drum 3 through pipe 2. For the moment, however, immediate consideration will be limited to the control system of Fig. 1 where the relation of air flow to megawatts is utilized as an index to reset the basic control of air flow in pipe 11 by the telemetered fluid pressure in pipe 14, representative of demand.

The measurement of a flow by means of differential pressures developed across a restriction in the flow is well known. It is conventional to utilize the differentials developed across selected points in a furnace as representative of the flow of air. This arrangement is illustrated in Fig. 1 where an air flow meter 15 is illustrated as responsive to differential pressures in furnace 1. The air flow meter 15 is to be taken as a conventional form of meter which produces a mechanical motion of arm 16 in accordance with the variation in magnitude of the air flowing through furnace 1. The same function of producing a mechanical motion is achieved by megawatt meter 17. Megawatt meter 17 may also be regarded as conventional. Similar structure is indicated in Dickey 2,593,660. The ultimate result is a motion of arm 18 in accordance with the quantity of electrical energy produced by generator 6.

As illustrated in Fig. 1, arm 16 of the air flow meter and arm 18 of the megawatt meter actuate a first fluid pressure regulator 19 which controls a source of fluid pressure indicated by legend. Meters 15 and 17 conjointly actuate regulator 19 through a differential linkage. The differential linkage includes means for varying the effect of each meter in positioning the pilot valve, characterized by cams 20 and 21.

Cams 20 and 21 are diagrammatically illustrated as included in the linkage between the meters and the differential linkage. Actually, adjustment of the pivot points of the linkage may accomplish the same result. However, the cam offers a more dramatic illustration means for varying the effect of the motion of arms 16 and 18 on the differential linkage connecting them to regulator 19.

In general, with the operation of the furnace 1 varied over its expected range of operation, the profiles of cams 20 and 21 may be shaped to produce linear motions of arms 22, 23 over the scale. The linkage is arranged to pivot so that as air flow increases, arm 16 will pivot upwardly, counterclockwise, and cause arm 22 to pivot downwardly, clockwise. The reverse is true for megawatt meter 17. An increase in megawatts causes arm 18 to fall and arm 23 to rise. Therefore, the simultaneous increase in both air flow and megawatts causes arms 22 and 23 to pivot in opposite directions. Pivot 24 and pivot 25 are consequently carried in opposite directions by reason of their direct connections with arm 22 and 23. Link 26 connects pivots 24 and 25 and therefore has its ends carried in directions corresponding to those described for pivots 24 and 25.

Link 26, between pivots 24 and 25, has the stem of regulator 19 connected to its mid-point pivot 27. The result of this arrangement is that a simultaneous increase of air flow and megawatts, in the desired relation, will cause pivot 25 to rise to A and pivot 24 to fall to B without pivot point 27 moving. A decrease in these factors will cause 25 to move to C and 24 to move to D without changing the output of regulator 19.

Should the megawatt output be increased in accordance with demand and, for some reason, insufficient air flow results, link 26 will take a position approximately illustrated with dashed line 26A and regulator 19 will increase in its control output. Conversely, upon a decrease in demand, with the megawatt output correspondingly decreased, there may be an excessive air flow and link 26 will approximate the position illustrated by dashed line 26B and regulator 19 will decrease in its control output.

The output of regulator 19 is a telemeter fluid pressure established in pipe 28. The control means 30 is shown in a well-known form of stacked-chamber relay through which the telemeter control fluid pressures may concomitantly control a regulator of the elements of combustion. As illustrated, control relay 30 establishes a fluid pressure output in pipe 31 in accordance with the conjoint influence of telemeter control fluid pressures in pipe 14 and pipe 28. This fluid pressure output established in pipe 31 positions second regulator 32, controlling the air in pipe 11. The result is a regulation of the air of combustion in accordance with the conjoint control of meters 12, 15 and 17.

The control system can now be analyzed as establishing a demand index in pipe 14 to simultaneously position second regulator 32 through relay 30 and third regulator 33 directly. Control relay 30 enables the output of first regulator 19 to readjust the control of one of the elements of combustion, here disclosed as air, in accordance with the deviation of the air and megawatts from their desired relation as empirically determined. Thus, with the air flow continuously controlling the meter 15 and the megawatt output continuously controlling the meter 17, first regulator 19 is conjointly actuated to produce a single control fluid pressure. With the pressure of steam continuously detected by meter 12, control relay 30 includes the means in control of the regulator for air concomitantly positioned from the three process factors. Specifically, the elements of combustion are continuously responsive to steam pressure, air flow, and electrical energy produced.

Referring next to Fig. 2, there is disclosed the same arrangement of furnace, drum, turbine, generator, fuel supply, air supply, air flow meter and megawatt meter as shown in Fig. 1. The same reference numbers have been used. However, the means through which air flow meter 15 and megawatt meter 17 produce a telemetered control fluid pressure in pipe 28 is different. The arrangement of Fig. 2, in this particular, discloses a different species of the invention.

As in Fig. 2, air flow meter 15 actuates a mechanical arm 16 and is connected, through cam 20, to indicator arm 22. Megawatt meter 17 similarly actuates arm 18, cam 21 and arm 23. However, instead of a differential linkage being actuated by arms 22 and 23, a pilot valve is attached to the arm 22 and a pilot valve is attached to arm 23 to produce fluid pressures which can be telemetered to a first regulator which is shown here in the form of standardizing relay 44 of the stacked-chamber type. Pilot valve 40 is directly connected to arm 22 to control an air supply in producing a fluid pressure in pipe 41. Pilot valve 42 is directly connected to arm 23 to control a supply in producing a fluid pressure in pipe 43.

The fluid pressure in pipe 41, representative of air flow to the combustion process in furnace 1, and the fluid pressure in pipe 43, representative of the megawatts of electrical energy produced by generator 6, are imposed upon regulator-relay 44 controlling an air supply to produce the telemeter fluid pressure in pipe 28. The remaining operation of the system of Fig. 2 duplicates that of Fig. 1.

Although somewhat diagrammatically disclosed here, the operation of regulator 44 should be clear from the drawing. Essentially, if an unbalance between the pressures in pipes 41 and 43 occurs, regulator 44 will cause the fluid pressure output in pipe 28 to progressively increase or decrease, depending upon the direction of unbalance, until the entire system is returned to balance and the fluid pressures of 41 and 43 are equal. A regulator of this type is disclosed in Gorrie Re. 21,804.

Figure 3:
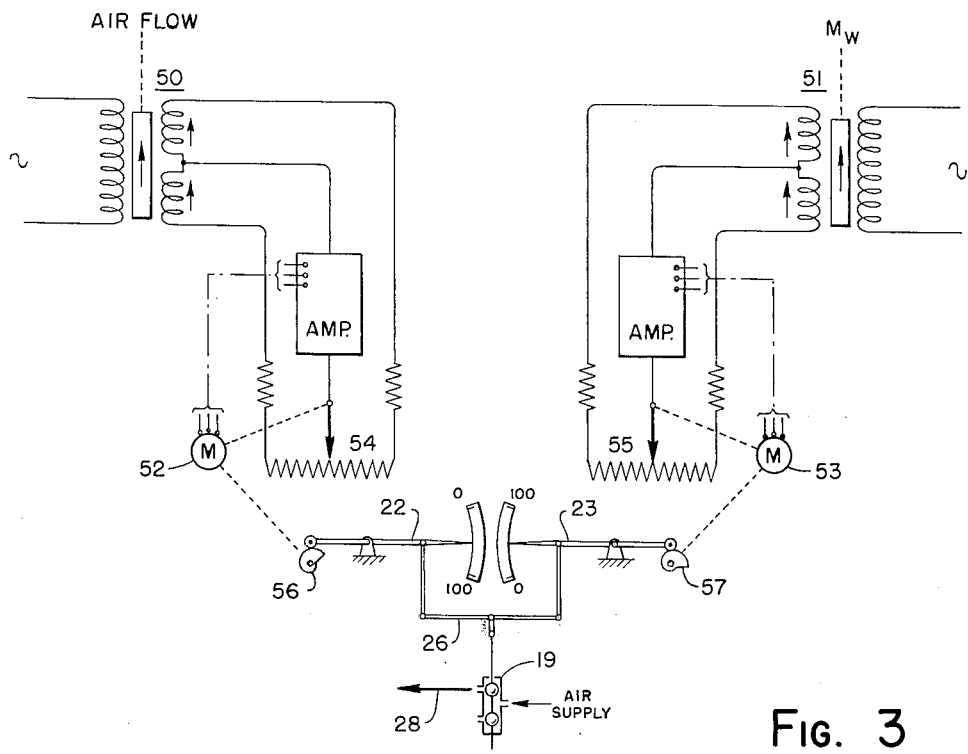
Fig. 3 is a diagrammatic illustration of part of a control system similar to that disclosed in Figs. 1 and 2 but disclosing electric embodiments of the individual meters.

Referring to Fig. 3, an electro-mechanical embodiment of the invention is disclosed. It does not appear necessary to again duplicate the disclosure of the furnace, turbine, generator, etc. in bringing out the possibility of air flow meter 15 and megawatt meter 17 actuating electric signal devices rather than mechanical cams. Therefore, with it now understood that the air flow meter 15 and megawatt meter 17 produce mechanical motions, it can be easily understood that the core of movable core transformers 50 and 51 may be actuated by these mechanical motions to produce electrical outputs representative of the variables. Movable core transformers, in measuring systems, are adequately illustrated in Hornfeck 2,439,891. This patent also discloses the balanceable electric network in which each of the transformers 50 and 51 are included.

The balanceable networks, including transformers 50 and 51, each include means for continuously maintaining the networks in balance. Motor 52 and motor 53 are the practical embodiments of these rebalancing elements. They are reversible motors which respond to network unbalances to actuate potentiometers 54 and 55.

At the same time the potentiometers 54 and 55 are actuated to maintain balance in their respective networks, motors 52 and 53 position cams 56 and 57, similar to the cams 20 and 21 of the preceding disclosure. The remainder of the structure of differential linkage and pilot valve is exactly as disclosed in Fig. 1. The resulting telemeter control fluid pressure developed in pipe 28 is fed into the control system of the preceding disclosure to carry out the objects of the invention.

Referring to Fig. 4, a graphic curve is used to depict the variation of the relation between the response of the air flow meter and megawatt meter over a range of load change at optimum combustion conditions in the furnace. Both the curve of the "dead-weight" response of the relation meter combination and the curve of the final, desired, calibrated response are depicted. The cams 20, 21 and 56, 57 represent the structure which is adjusted to achieve the desired calibration.

The megawatt meter 17 is individually calibrated to respond to the power output of generator 6 and manifest the values on the linear scale disclosed. The practical problem then becomes one of adjusting the remainder of the mechanism, including the air flow meter and differential linkage, to maintain the output of the first regulators, 19 or 44, constant as the load swings over its range. If the differential linkage is geometrically balanced, it is only necessary to shape the air flow cam so that pointer arm 22 swings linearly over its scale as the air flow varies with respect to the megawatts as depicted by the "Final Calibration Curve" of Fig. 4 when the combustion is at optimum conditions as empirically established.

A first practical step to calibration is to set the air flow cam profile, or pivot adjustments, to the approximate response desired. This can be done from experience. The "Preliminary Calibration Curve" is representative of the response which might be expected. Loading the disconnected, air flow meter with weights, to represent differential values demonstrates the preliminary setting of the mechanism with which the meters conjointly actuate the first regulators.

The second practical step in the procedure is to connect the meters to the process apparatus and vary the output while maintaining optimum combustion conditions. At least three points within this range are necessary to obtain satisfactory results. These points of air flow-megawatt values become the "Final Calibration Curve" of Fig. 4. The three points are indicated without designation to transmit the idea of desired spacing with respect to the load range.

The third phase of calibration is to adjust the air flow mechanism through its cam profile to match the megawatt manifestations at the three points. With the manifestations on the scales, matched during optimum combustion, and the differential linkage geometrically balanced, subsequent control action from the first controller will automatically adjust the air regulator to match the manifestations and maintain the relation of the "Final Calibration Curve."

Referring to Fig. 5, the output of megawatt meter 17 is disclosed as utilized in combustion control and the control of feedwater to drum 3. The preceding disclosure has indicated measurements of feedwater flow and drum level. It is customary to control the supply of feedwater in accordance with the amount of water in the system, the flow of feedwater to the drum and an index representative of changes in load. With generator output now demonstrated as an adequate substitution for steam flow, Fig. 5 illustrates its usage in the multi-element control of feedwater as well as combustion control.

The combustion control segment of the system, responsive to steam pressure meter 12, air flow meter 15 and megawatt meter 17 is the same as disclosed in Fig. 2. The second segment of the control, is responsive to megawatt meter 17, feedwater flow meter 70 and drum level meter 71. All meters are shown with mechanical cams which represent characterizing possibilities between the mechanical motions of their indicating-controlling arms and the pilot valves they actuate to establish telemeter fluid pressures.

Meter 70 establishes a fluid pressure in pipe 72, balanced against the fluid pressure that megawatt meter 17 establishes in pipe 73. Relay 74 balances these two pressures to produce the output fluid pressure in pipe 75. The pressure in pipe 75 is balanced against the pressure in pipe 76, established by drum level meter 71. Relay 77 responds to the pressure in pipes 75 and 76 to balance them and establish an output control pressure in pipe 78. The pressure in pipe 78 is used to regulate the position of feedwater valve 79 in pipe 2. The result is smooth three-element regulation of feedwater to the process in accordance with load on the process and capacity of the apparatus.

What we claim as new, and desire to secure by Letters Patent of the United States, is:

1. A system for controlling a variable in the steam generating process of an electric power producing unit of the type wherein all of the steam produced by a single steam generator is utilized in a single turbo generator, including, a furnace supplied fuel and air for combustion,
a steam generator heated by the furnace combustion to produce steam,
a turbine rotated by the steam to produce motive power,
an electric generator actuated by the motive power of the turbine to produce electric power,
a first meter continuously responsive to the supply of combustion air to the process,
a second meter continuously responsive to the quantity of electric power generated,
a source of fluid pressure,
a first regulator for the fluid pressure source,
means solely responsive to the first and second meters for actuating the first regulator,
a second regulator for the supply of combustion air to the furnace,
and means controlling the second regulator with the fluid pressure output of the first regulator.

2. The system of claim 1 in which the first regulator of the fluid pressure source is a pilot valve,
and differential linkage is provided through which the meters position the pilot valve conjointly.

3. The system of claim 2 in which the differential linkage includes means for varying the effect of each meter on the positioning of the pilot valve.

4. The system of claim 3 in which the means for varying the effect of each meter includes a mechanical cam in the differential linkage.

5. The system of claim 1 including, a third meter continuously responsive to the pressure of steam produced by the steam generator,
a third regulator for the supply of fuel to the furnace,
and means for controlling the second and third regulators simultaneously from the third meter.

6. The system of claim 1 in which the first regulator of the fluid pressure source is a standardizing relay, an individual fluid pressure pilot valve is positioned by each meter,
and means is provided to conjointly actuate the first regulator by the output of the pilot valves.

7. The system of claim 6 including, a third meter continuously responsive to the pressure of steam produced by the steam generator,
a third regulator for the supply of fuel to the furnace,
and means for controlling the second and third regulators simultaneously from the third meter.

8. The system of claim 1 in which the first regulator of the fluid pressure source is a pilot valve, the means for actuating the first regulator by the meters include electric signal devices,
separate null-balance electric networks including the electric signal devices,
and balancing elements in each of the null-balance electric networks conjointly actuate the first regulator.

9. The system of claim 8 in which the balancing elements in each of the null-balance electric networks are reversible electric motors actuating the first regulator through differential linkage.

10. The system of claim 9 in which the differential linkage includes means for varying the effect of each motor on actuating the first regulator.

11. A control system for a power generating unit of the type wherein all of the steam produced by a single steam generator is utilized in a single turbo-generator, comprising, a furnace supplied fuel and air for combustion,
a steam generating means supplied water and heated by the combustion to produce steam,
a turbine rotated by the steam to produce motive power,
an electric generator actuated by the motive power of the turbine to produce electric power,
a first meter responsive to the supply of one of the elements of combustion to the furnace,
a second meter continuously responsive to the quantity of electric power generated,
a source of fluid pressure,
a first regulator for the fluid pressure source positioned solely by the first and second meters to produce a first control fluid pressure,
a third meter responsive to the pressure of the steam generated and producing a second control pressure,
a second regulator for the other elements of combustion directly responsive to the second control fluid pressure,
and a third regulator for said one of said elements of combustion conjointly responsive to the first and second control pressures.

12. A system for controlling a variable of a power generating unit of the type wherein all of the steam produced by a single steam generator is utilized in a single turbo-generator, comprising, a furnace supplied with an element of combustion, a steam generator heated by the furnace combustion to produce steam, a turbine rotated by the steam to produce motive power, an electric generator actuated by the motive power of the turbine to produce electric power, a first meter of the rate of supply of the element of combustion, a second meter of the rate of power generation; and means responsive solely to said meters for regulating the rate of supply of the element of combustion to maintain the rate thereof in predetermined relation to the rate of power production.

13. A system for controlling a variable of a power generating unit of the type wherein all of the steam produced by a single steam generator is utilized in a single turbo-generator, comprising, a furnace supplied fuel and air for combustion, a steam generator heated by the furnace combustion to produce steam, a turbine rotated by the steam to produce motive power, an electric generator actuated by the motive power of the turbine to produce electric power, a first meter for measuring the rate of air flow to the furnace, a second meter for measuring the rate of electric power generation, means for regulating the rate of air supply to the furnace, and means conjointly operated by said meters for controlling said last named means to maintain the rate of air flow to the furnace in predetermined relation to the rate of power production.

14. A system for controlling a variable of a power generating unit of the type wherein all of the steam produced by a single steam generator is utilized in a single turbo-generator, comprising, a furnace supplied fuel and air for combustion, a steam generator heated by the furnace combustion to produce steam, a turbine rotated by the steam to produce motive power, an electric generator actuated by the motive power of the turbine to produce electric power, a first meter for measuring the rate of power production, a function generator operated by said meter for producing an effect corresponding to the desired rate of air flow to the furnace, a meter of the actual rate of air flow to the furnace, and means under the conjoint control of the effect produced by said function generator and said last named meter for maintaining the actual rate of air flow to the furnace equal to the desired rate of air flow to the furnace.

15. A system for controlling a variable of a power generating unit of the type wherein all of the steam produced by a single steam generator is utilized in a single turbo-generator, comprising, a furnace supplied fuel and air for combustion, a steam generator heated by the furnace combustion to produce steam, a turbine rotated by the steam to produce motive power, an electric generator actuated by the motive power of the turbine to produce electric power, a first meter for measuring the rate of power production, a function generator operated by said meter for producing an effect corresponding to the desired rate of supply of an element of combustion to the furnace, a meter of the actual rate of supply of said element of combustion to the furnace, and means under the conjoint control of the effect produced by said function generator and said last named meter for maintaining the actual rate of supply of the element of combustion to the furnace equal to the desired rate of supply of the element of combustion to the furnace.

References Cited in the file of this patent

UNITED STATES PATENTS

| | | |
|---|---|---|
| Re. 21,804 | Gorrie | May 20, 1941 |
| 1,166,758 | Gibson | Jan. 4, 1916 |
| 1,894,616 | Bailey | Jan. 17, 1933 |
| 2,053,061 | Bristol | Sept. 1, 1936 |
| 2,098,913 | Dickey | Nov. 9, 1937 |
| 2,184,224 | Lucke | Dec. 19, 1939 |
| 2,243,944 | Donaldson | June 3, 1941 |
| 2,252,492 | Cortese | Aug. 12, 1941 |
| 2,433,725 | Ziebolz | Dec. 30, 1947 |
| 2,439,891 | Hornfeck | Apr. 20, 1948 |
| 2,593,660 | Dickey | Apr. 22, 1952 |
| 2,743,710 | Shannon | May 1, 1956 |
| 2,774,019 | Hornfeck | Dec. 11, 1956 |